Figure 1:
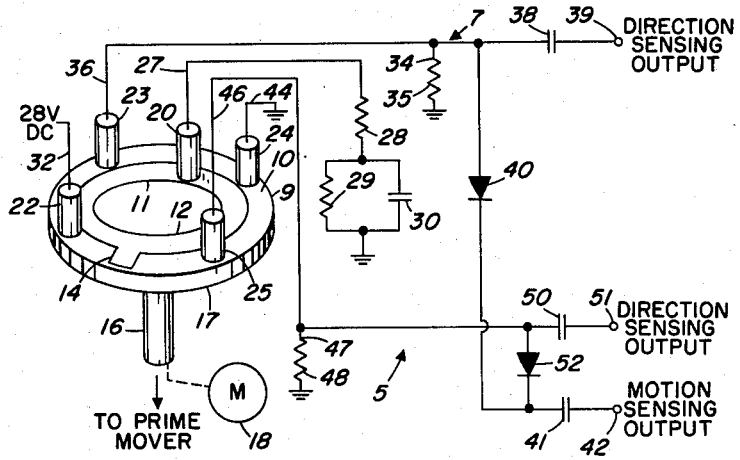

Feb. 4, 1964 R. C. BEASON ETAL 3,120,655

MOTION AND DIRECTION SENSING DEVICE

Filed Dec. 22, 1961

INVENTORS
RAYMOND C. BEASON
BERNARD J. BEITMAN JR.
BY
*Moody and Harris*

ATTORNEYS

United States Patent Office 3,120,655
Patented Feb. 4, 1964

3,120,655
MOTION AND DIRECTION SENSING DEVICE
Raymond C. Beason, Cedar Rapids, and Bernard J. Beitman, Jr., Marion, Iowa, assignors to Collins Radio Company, Cedar Rapids, Iowa, a corporation of Iowa
Filed Dec. 22, 1961, Ser. No. 161,445
9 Claims. (Cl. 340—271)

This invention relates to a motion and direction sensing device and more particularly to an electrical device for sensing motion and direction of motion of a rotatable shaft or the like.

It is often found desirable to have a device capable of not only providing a positive indication of motion at one output terminal, but in addition, the direction of that motion at another output terminal.

Such a device is often necessary, for example, in computers where both shaft rotation and direction of rotation may be controlling factors, or in antenna coupling and matching networks where the motion imparted by a prime mover to tune a variable element must be sensed, both for motion and direction of that motion, to achieve impedance matching of the antenna to the input line.

An example of the latter use is shown and described in the copending United States patent application entitled "Coupling and Impedance Matching Network," Serial Number 161,598, inventor Bernard J. Beitman, Jr., et al., filed December 22, 1961, and assigned to the assignee of the present invention.

While many electrical devices have been proposed or utilized heretofore to sense motion of a rotatable shaft, no such device has been completely successful in accomplishing this end with simple, yet dependable, means capable of providing separate outputs indicating motion and the direction of that motion.

It is therefore an object of this invention to provide an improved motion and direction sensing device which is simple in construction yet highly dependable in operation.

It is also an object of this invention to provide an improved motion and direction sensing device capable of providing separate indications for motion and direction of that motion.

It is still another object of this invention to provide an improved motion and direction sensing device having relatively movable means for charging a capacitor therethrough and then later discharging the same upon relative movement between said movable means, and means for developing an output signal due to said capacitor discharge in such a manner so as to provide an indication at one output terminal of motion and at a second output terminal of direction of said motion.

In addition, a problem often arising when utilizing relatively movable means, such as a commutator and brushes, is that of jitter or chatter due to undesirable and repeated alternate contact of adjacent brushes with the conductive path on the commutator to thus produce an erroneous output signal indicating motion of the commutator in a particular direction when, in fact, no such motion exists.

It is therefore another object of this invention to provide an improved electrical motion and direction sensing device that precludes false output signals due to jitter or chatter.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment of the herein described invention may be submitted as come within the scope of the claims.

Figure 2:
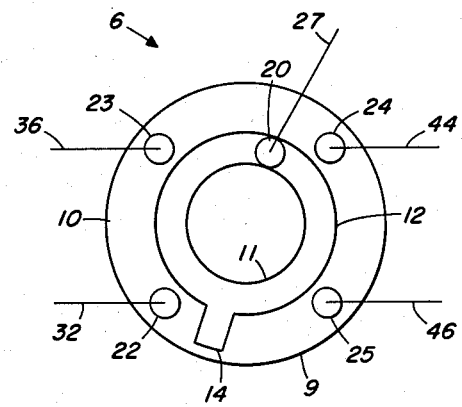

The accompanying drawing illustrates one complete example of the embodiment of the invention constructed according to the best mode so far devised for the practical application of the principles thereof, and wherein:

FIGURE 1 is a combined perspective view and schematic presentation of the motion and direction sensing device of this invention; and FIGURE 2 is a top elevation view of the commutator and brushes shown in FIGURE 1.

Referring now to the drawings, the numeral 5 indicates generally the direction and motion sensing device of this invention which includes switching means 6 and output signal developing means 7.

As shown in FIGURES 1 and 2, switching means 6 preferably includes a flat disc-like commutator 9 of insulating material, which commutator has on one face 10 an electrically conductive area 11 consisting of a circular commutator path 12 and a projection 14 extending radially outwardly from path 12. If desired, conductive area 11 could consist of a thin layer of metal deposited on face 10 by conventional printed circuit methods such as by a silk screening and etching process, for example, as is well known in the art.

A rotatable shaft 16 is fixed at one end by conventional fastening means (not shown) to the opposite face 17 of commutator 9 with shaft 16 and commutator 9 coaxial as shown in FIGURE 1. Shaft 16 is mechanically linked to a prime mover 18, preferably an electric motor, so that shaft 16 is constrained to partake of all motion of the motor shaft in either direction.

A brush 20 is, as shown in FIGURES 1 and 2, in constant engagement with circular path 12 while a plurality of brushes 22, 23, 24 and 25 constantly engage face 10 outwardly of path 12 so as to engage projection 14 as the commutator is rotated. The commutator and brushes therefore coact as a switching means when the commutator is rotated since electrically conductive area 11 on face 10 is in constant engagement only with brush 20 while successively contacting the other four brushes 22, 23, 24 and 25.

It is to be appreciated, of course, that the commutator and brushes might be varied as would be obvious to one skilled in the art without departing from the scope of this invention. For example, the commutator could take the form of a cylinder, conductive area 11 could include a plurality of projections 14, extending outwardly or inwardly, so long as no more than one projection is ever in contact with any of the brushes 22 through 25, or several sets of brushes 22 through 25 could be spaced about the commutator.

Brush 20 is connected by means of lead 27 and resistor 28 to one side of resistor 29 and capacitor 30, both of which are connected to ground at the other side. Brush 22 is connected by means of lead 32 to a source of direct voltage, preferably 28 volts.

Brush 23 is connected with one side 34 of a resistor 35 through lead 36, with the other side of said resistor being connected to ground. In addition, side 34 of resistor 35 is connected through coupling capacitor 38 to direction sensing output terminal 39 and through serially connected diode 40 and coupling capacitor 41 to sensing output terminal 42. Brush 24 is connected to ground by means of lead 44.

Brush 25 is connected by means of lead 46 to one side 47 of resistor 48, which resistor has its other side connected to ground. Side 47 of resistor 48 is also connected through coupling capacitor 50 to a second direction sensing output terminal 51, and through serially connected diode 52 and capacitor 41 to motion sensing output terminal 42.

Diodes 40 and 52 have common poles connected to capacitor 41 and are connected, of course, to pass an output voltage to motion sensing output 42.

In operation, assuming that commutator 9 and brushes 22 through 25 are in the relative positions as shown in FIGURE 1, there can be, of course, no output to any output terminal since there is no complete circuit, or in other words, the switching means is in an open circuit position.

As the commutator turns clockwise (as shown in FIGURE 1), however, projection 14 is brought into contact with brush 22. This causes capacitor 30 to be charged by the direct voltage source through conductive area 11.

As commutator 9 continues to rotate in the clockwise direction, capacitor 30 begins to discharge through resistor 29. Before capacitor 30 can be discharged through resistor 29, however, projection 14 comes into contact with brush 23 so that capacitor 30 now discharges, at least in part, through resistor 35.

The voltage developed by resistor 35 is coupled through capacitor 38 to direction sensing output terminal 39 and the resulting output signal can be used, for example, to control a conventional bistable multivibrator, or flip flop.

In addition, the developed signal is also coupled through diode 40 and capacitor 41 to motion sensing output terminal 42 and this resulting output signal can be used, again by way of example, to control a second flip flop. Diode 52, of course, precludes the output signal from also passing through capacitor 50 to direction sensing output terminal 51.

As the commutator continues to turn clockwise, projection 14 next comes into contact with brush 24 to completely discharge capacitor 30 to ground. Thus, when commutator 9 later rotates clockwise so that projection 14 comes into contact with brush 25, there can be no output signal developed since capacitor 30 has already been fully discharged. This means, of course, that no voltage is developed across resistor 48 and, therefore, no output signal appears at direction sensing output terminal 51.

If commutator 9 is rotated in the opposite direction (counterclockwise as shown in FIGURE 1), there can be no output signal developed until projection 14 first comes into contact with brush 22 to charge capacitor 30 and then later comes into contact with brush 25. When this occurs, capacitor 30 is at least partially discharged through resistor 48 to develop a voltage thereacross. This direct voltage is coupled through capacitor 50 to direction sensing output terminal 51, and through diode 52 and coupling capacitor 41 to motion sensing output terminal 42 to provide direction and motion output signals, respectively, to these terminals. Diode 40, of course, precludes the developed voltage from reaching direction sensing output terminal 39.

As the commutator continues to turn in a counterclockwise direction, projection 14 next engages brush 24 to completely discharge capacitor 30 so that when projection 14 later comes into contact with brush 23 no output signal is coupled to direction sensing output terminal 39.

It can therefore be seen that an output signal is coupled to terminal 42 regardless of direction of rotation of the commutator, while an output is coupled to only one of the two direction sensing terminals depending upon the actual direction of rotation of the commutator.

From the foregoing, it is to be realized that brushes 22 through 25 should be spaced and the values of electrical components so chosen that capacitor 30 retains sufficient charge so that an output signal is produced when the commutator is actually rotating. The minimum sensing threshold can be established, as desired, through selection of component values of resistor 29 and capacitor 30. However, when the commutator is not rotating, resistor 29, of course, discharges capacitor 30 to preclude an erroneous output signal when the commutator is again caused to rotate.

It is also necessary that a minimum spacing be retained between brushes 22 through 25 to assure against chatter or jitter which could occur, for example, if the conductive area 11 of commutator 9 alternately and repeatedly contacts brushes 22 and 23 (oscillates therebetween). It has been found that if the distance between brushes is greater than the maximum play, or free movement, of commutator 9 plus the width of projection 14, an erroneous output signal due to chatter or jitter is precluded.

While it is to be appreciated that particular component values might be varied to suit a particular need, the following is illustrative of one working embodiment utilizing a 28 volt D.C. power supply:

| Number | Component | Value |
| --- | --- | --- |
| 29 | Resistor | 12K ohms. |
| 30 | Capacitor | 10 μfds. |
| 35 | Resistor | 3,300 ohms. |
| 38 | Capacitor | 0.02 μfds. |
| 40 | Diode | 1 N 645. |
| 41 | Capacitor | 10 μfds. |
| 48 | Resistor | 3,300 ohms. |
| 50 | Capacitor | 0.02 μfds. |
| 52 | Diode | 1 N 645. |

From the foregoing, it should be evident to those skilled in the art that the improved motion and direction sensing device of this invention provides a simple yet dependable means for producing separate output signals indicating motion and direction of said motion.

What is claimed as our invention is:

1. A motion and direction sensing device, comprising: a commutator having an electrically conductive portion; first, second, third and fourth brushes, each said brush being engageable with said conductive portion to the exclusion of said other brushes; capacitor means connected between said conductive portion and ground; means connecting said first brush to a source of direct voltage; first resistance means connected between said second brush and ground; first output means connected to the junction of said second brush and said first resistance means; means connecting said third brush to ground; second resistance means connected between said fourth brush and ground; second output means connected to the junction of said fourth brush and said second resistance means; third output means connected to said second and fourth brushes, said third output means including means for blocking passage of direct voltage signals between said second and fourth brushes through said third output means; and means for causing movement of said commutator in opposite directions with respect to said brushes, said movement in one direction causing said conductive portion to exclusively engage in sequence said first, second, third and fourth brushes whereby said capacitor means is charged when in contact with said first brush and at least partially discharged through said first resistance means when in contact with said second brush to develop an output signal at said third output means to indicate commutator movement and at said first output means to indicate that said movement is in said one direction, said movement in the opposite direction causing said conductive portion to exclusively engage in sequence said first, fourth, third and second brushes whereby said capacitor means is charged when in contact with said first brush and at least partially discharged through said second resistance means when in contact with said fourth brush to develop an output signal at said third output means to indicate commutator movement and at said second output means to indicate that said movement is in said opposite direction, said third brush discharging said capacitor means to assure against an output signal being developed when the conductive portion of said commutator later moves into contact with the last brush in sequence.

2. The motion and direction sensing device of claim 1 further characterized by resistance means connected in parallel with said capacitor means, said resistance means discharging said capacitor means when said commutator is not moving in either of said direction to assure against a false output signal when said commutator is again later moved in one of said directions.

3. The motion and direction sensing device of claim 1 wherein said capacitor means is connected between said conductive portion and ground by means of a fifth brush constantly engaging said conductive portion.

4. The motion and direction indicating device of claim 1 wherein said brushes are spaced a distance such that alternate contact of said first brush and an adjacent brush to said conductive portion is precluded whenever said commutator is not being revolved by said prime mover to thereby assure against a false output signal being coupled to said output means.

5. A motion and direction sensing device, comprising: a commutator having a first conductive portion and a second conductive portion electrically connected to said first conductive portion; a first brush in constant engagement with said first conductive portion; second, third and fourth brushes engageable with said second conductive portion; capacitor means connecting said first brush to a point of common potential; means connecting said second brush to a source of direct voltage; first resistance means connecting said third brush to said point of common potential; second resistance means connecting said fourth brush to said point of common potential; first output means connected to the junction of said third brush and said first resistance means; second output means connected to the junction of said third brush and said first resistance means and to the junction of said fourth brush and said second resistance means, said second output means including means for blocking passage of direct voltage signals between said third and fourth brushes through said second output means; and means for causing movement of said commutator in opposite directions with respect to said brushes, said movement in one direction causing said second conductive portion to engage individually in sequence said second and third brushes whereby an output signal is developed and coupled to said first output means indicating direction of movement and to said second output means to indicate motion, and said movement in the opposite direction causing said second conductive portion to engage individually in sequence said second and fourth brushes whereby an output signal is developed and coupled to said second output means to indicate motion.

6. The motion and direction sensing device of claim 5 further characterized by a fifth brush engageable with said second conductive portion of said commutator after said third brush engages said second conductive portion when said commutator is caused to be moved in said one direction and after said fourth brush engages said second conductive portion when said commutator is caused to be moved in said opposite direction, said fifth brush being connected to ground to discharge said capacitor and thereby assure against erroneous output signals.

7. A motion and direction sensing device, comprising: switching means including first, second, third and fourth contactor means, said first contactor means being engageable with said other contactor means to complete an electrical circuit therethrough; capacitor means connected between said first contactor means and a point of common potential; means adapting said second contactor means for connection to a source of direct voltage; first resistance means connected between said third contactor means and said point of common potential; first output means connected to the junction of said third contactor means and said first resistance means; second resistance means connected between fourth contactor means and said point of common potential; second output means connected to the junction of said fourth contactor means and said second resistance means; third output means connected to said third and fourth contactor means, said third output means including means for blocking passage of direct voltage signals between said third and fourth contactor means through said third output means; and means for causing relative movement between said contactor means, said movement in one direction causing said first contactor means to successively and individually engage said second and then said third contactor means whereby said capacitor means is charged and then at least partially discharged through said first resistance means to produce a motion indicating output at said third output means and an output at said first output means indicating the direction of said motion, said movement in the opposite direction causing said first contactor means to successively and individually engage said second contactor means and then later said fourth contactor means whereby said capacitor is charged and then at least partially discharged through said second resistance means to produce a motion indicating output at said third output means and an output at said second output means indicating the direction of said motion.

8. The motion and direction sensing device of claim 7 further characterized by a fifth contactor means engageable with said first contactor means to completely discharge said capacitor means, said fifth contactor means engaging said first contactor means after said third contactor means when relative movement is in said one direction and after said fourth capacitor means when relative movement is in said opposite direction.

9. The motion and direction sensing device of claim 8 wherein said movable contactor is caused to follow an endless path whereby said motion and direction indicating signals may be repeatedly generated.

No references cited.

UNITED STATES PATENT OFFICE
CERTIFICATE OF CORRECTION

Patent No. 3,120,655                              February 4, 1964

Raymond C. Beason et al.

It is hereby certified that error appears in the above numbered patent requiring correction and that the said Letters Patent should read as corrected below.

In the grant (only), line 1, name of first inventor, for "Raymond C. Benson" read -- Raymond C. Beason --; column 5, line 2, for "direction" read -- directions --; column 6, line 47, for "capacitor" read -- contactor --.

Signed and sealed this 23rd day of June 1964.

(SEAL)
Attest:

ERNEST W. SWIDER                                     EDWARD J. BRENNER
Attesting Officer                                        Commissioner of P------